Aug. 25, 1931. H. BAYHA ET AL 1,820,726
HUMIDIFYING GAS PRIOR TO PURIFYING IT
Filed July 23, 1929
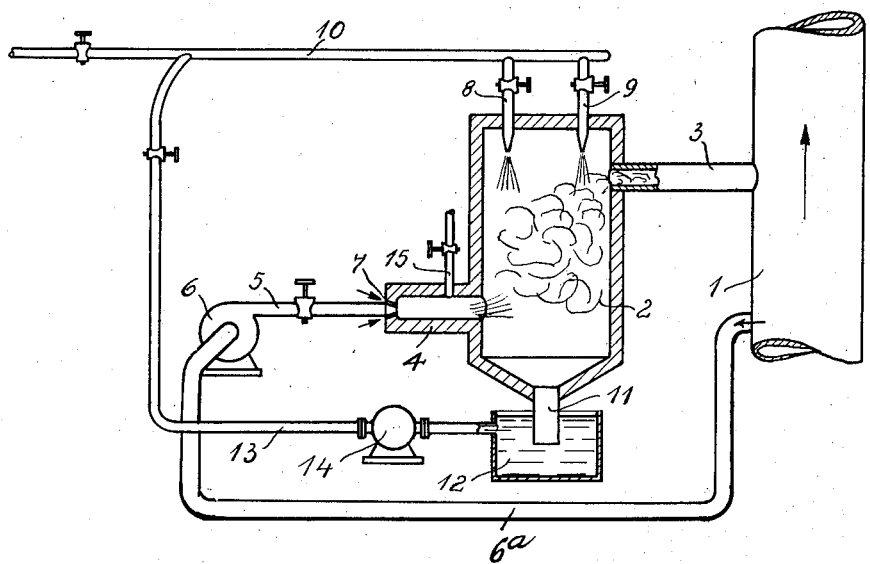
Inventors
Helmut Bayha,
Carl Hahn, and
Oscar Heymann,
By Knight Bros. Attys.

Patented Aug. 25, 1931

1,820,726

UNITED STATES PATENT OFFICE

HELMUT BAYHA, OF BERLIN-CHARLOTTENBURG, CARL HAHN, OF BERLIN-SIEMENS-STADT, AND OSCAR HEYMANN, OF BERLIN-WILMERSDORF, GERMANY, ASSIGNORS TO SIEMENS-SCHUCKERTWERKE AKTIENGESELLSCHAFT, OF BERLIN-SIEMENS-STADT, GERMANY, A CORPORATION OF GERMANY

HUMIDIFYING GAS PRIOR TO PURIFYING IT

Application filed July 23, 1929, Serial No. 380,309, and in Germany June 1, 1929.

Our invention relates to improvements in humidifying gases prior to purifying them.

The purification of gases, more particularly by electrostatic discharges may, as is well known in the art, be carried out best if the gases possess a sufficient relative humidity. In many cases raising of the dew point or the relative humidity of the gases is thus necessary prior to their entry into the purifying apparatus. The increase of the relative humidity may be effected by cooling, the raising of the dew point by the injection of water. The injection of water into gas is practically permissible only if the temperature is sufficiently high, i. e. generally if it lies above 100°. In some cases great difficulties may arise then, due to dust suspended in the gas causing deposits in the humidification plant and the piping. Since, furthermore, the water injected does not evaporate completely, a further difficulty arises in the discharge of the dust-containing water separately from the gas. If the temperature of the gas is already low it is necessary to introduce steam into the gas instead of the water. If live steam were tapped from the steam mains the economy of the purification plant might easily become questionable.

The object of our invention is to eliminate the difficulties arising in the increase of the relative humidity of the gases to be purified. The process according to our invention consists in admixing a liquid, such as water, with the products of combustion of a hot gas flame burning in a receptacle and introducing the steam thus generated into the gases to be purified. This process is very economical for the reason that the heat contained in the gases of combustion is almost completely utilized for the evaporation of the liquid. A portion of the raw gases to be purified may preferably be utilized for feeding the gas flame. Since these gases are usually available in sufficient quantity and are very inexpensive the process is in this case particularly economical. In some cases already purified gas may be used for feeding the gas flame.

The liquid not evaporated in the gas flame is preferably caught and returned to the flame in a closed cycle of circulation. This fact also leads to a cheapening of our process. The sludge formed when burning non-purified gases may likewise be returned to the gas flame in a cycle of circulation without any difficulties arising. The evaporation may, if desired, be attained by letting the gas flame burn in the interior of the quantity of liquid to be avaporated and introduced into the receptacle (immersion flame).

Equipment suitable for carrying out our improved process consists of a receptacle in communication with the raw gas conduit in which are located a gas-fed burner and supply nozzles for the liquid to be evaporated. In the gas supply pipe there is, if found necessary, located a special compressor for increasing the gas pressure. The steam developing receptacle is preferably so designed that it possesses at its bottom a drain pipe which extends into a cup adapted to catch the liquid which has not evaporated. The collecting cup may be connected with the injector nozzle by a pipe by means of which the liquid which has collected in the cup is returned to the nozzle in a cycle of circulation.

A preferred embodiment of our invention is illustrated partly diagrammatic, partly in sectional elevation in the drawing affixed to our specification.

Referring to this drawing 1 is the pipe or conduit by which the crude gas is supplied to a gas purifying or dust precipitating plant, such as an electric precipitator or electrofilter not shown in the drawing because it is well known in the art. 2 is the steam generating receptacle or boiler which is in communication with the crude gas conduit 1 by the pipe 3. The steam generating receptacle 2 is provided at its lower portion with a tubular extension 4 which serves as gas burner. Into the outer end of this extension, and in the direction of its longitudinal axis, leads a gas supply pipe 5 by which through the blower 6 crude or purified gas is blown into the extension 4. In the present case crude gas, derived through pipe 6ª from conduit 1 is utilized. The openings 7 serve for the supply of air for the flame developing in the interior of the extension 4.

In the wall of receptacle 2 are arranged the regulable nozzles 8 and 9 which are fed by the pipe 10 with the liquid to be evaporated, such as water. In the bottom 2 of the receptacle sloping towards the center is provided a drain pipe 11 opening into the collecting cup or tank 12. The collecting cup is by a pipe 13 connected with the pipe 10 leading to the nozzles so that the liquid collecting in cup 12 can be returned to the nozzles 8 and 9 by the aid of pump 14 connected in the pipe 13. From the tubular extension 4 of the steam generator branches a pipe 15 through which a portion of the fuel gas may, prior to the meeting with the evaporation liquid, be tapped and passed to the electrical precipitator for flushing the insulators, for instance.

The apparatus operates in such a manner that in the steam generating receptacle 2 hot combustion gases are introduced from the tubular extension 4 and through the nozzles 8 and 9 a certain quantity of liquid. The liquid is quickly converted into steam by the hot combustion gases and passes together with the combustion gases through the pipe 3 into the pipe 1 conducting the crude gas and there imparts to this gas the humidity in form of steam which is necessary or desirable for raising the purifying efficiency of the electrical precipitator. In case the evaporation of the liquid in the combustion chamber is not complete, the unevaporated liquid flows into the cup 12 and may be returned thence to the nozzles 8 and 9 by the pipes 13 and 10.

Even when employing crude gases for the generation of steam disturbances in the operation need not be feared since the nozzles 8 and 9 may have a comparatively large cross-sectional area and be so designed that they may easily be cleaned.

By regulating the combustion gases, the combustion, air and the quantity of liquid or one or two of these factors by means of valves located in the various pipes the quantity, temperature and humidity of the gases passing into the crude gas may be regulated within wide limits. The temperature and the relative humidity of the gas to be purified may thus be adjusted to the desired value.

A further advantage of our improved apparatus is that in case a cooler is provided behind the electrical gas purifier or dust precipitator, the water of condensation collecting in this cooler may be employed for the evaporation in the steam generator.

Various modifications and changes may be made without departing from the spirit and the scope of the invention.

We claim as our invention:

1. In a gas purification process, in particular of the electrical type, the process of increasing the relative humidity of gases to be purified by the introduction of steam into the gases, which consists in introducing into the gaseous combustion products of a gas flame, burning in a receptacle and fed with a portion of the gas under treatment, a liquid, such as water, and conductnig the steam thus generated into the gases to be purified.

2. In a gas purification process, in particular of the electrical type, the process of increasing the relative humidity of gases to be purified by the introduction of steam into the gases, which consists in introducing into the gaseous combustion products of a gas flame burning in a receptacle, a liquid, such as water, conducting the steam thus generated into the gases to be purified, and collecting the liquid not evaporated and returning it into the gas flame.

3. In a gas purification process, in particular of the electrical type, the process of increasing the relative humidity of gases to be purified, which consists in introducing into the gases steam generated by injecting a liquid, such as water, into the combustion products of a flame burning in a receptacle and fed with crude gas, and returning the sludgy liquid precipitated from the crude gas to the flame in a cycle of circulation.

In testimony whereof we affix our signatures.

HELMUT BAYHA.
CARL HAHN.
OSCAR HEYMANN.